(12) United States Patent
Tu et al.

(10) Patent No.: US 8,917,770 B2
(45) Date of Patent: Dec. 23, 2014

(54) MOTION ESTIMATION APPARATUS AND MOTION ESTIMATION METHOD

(75) Inventors: Ying-Chieh Tu, Hsinchu Hsien (TW); Hong Wei-Hsiang, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 870 days.

(21) Appl. No.: 13/017,780

(22) Filed: Jan. 31, 2011

(65) Prior Publication Data
US 2011/0293011 A1 Dec. 1, 2011

(30) Foreign Application Priority Data

May 27, 2010 (TW) .............................. 099117084 A

(51) Int. Cl.
| | |
|---|---|
| H04N 7/12 | (2006.01) |
| H04N 11/02 | (2006.01) |
| H04N 11/04 | (2006.01) |
| G06E 1/00 | (2006.01) |
| G06E 3/00 | (2006.01) |
| G06F 15/18 | (2006.01) |
| G06G 7/00 | (2006.01) |
| H04N 19/567 | (2014.01) |
| H04N 19/51 | (2014.01) |
| H04N 19/43 | (2014.01) |

(52) U.S. Cl.
CPC ... *H04N 19/00672* (2013.01); *H04N 19/00587* (2013.01); *H04N 19/00509* (2013.01)
USPC ........................................ 375/240.16; 706/17

(58) Field of Classification Search
USPC ...................................................... 375/240.16
See application file for complete search history.

(56) References Cited

U.S. PATENT DOCUMENTS

| | | | |
|---|---|---|---|
| 2005/0135484 A1* | 6/2005 | Lee et al. ................. | 375/240.16 |
| 2008/0126278 A1* | 5/2008 | Bronstein et al. ............... | 706/17 |

* cited by examiner

*Primary Examiner* — Hee-Yong Kim
(74) *Attorney, Agent, or Firm* — Han IP Corporation

(57) ABSTRACT

A motion estimation apparatus used in a video encoding system is provided. The motion estimation apparatus includes a first calculation module and a second calculation module. When a search position moves from a first candidate search position to a second candidate search position along a search path, the first calculation module estimates a first differential motion vector cost according to a search path information corresponding to the search path. The second calculation module selectively adds the first differential motion vector cost to an initial motion vector cost or subtracts the first differential motion vector cost from the initial motion vector cost according to a predetermined rule, so that a first motion vector cost corresponding to the second candidate search position is obtained.

15 Claims, 8 Drawing Sheets

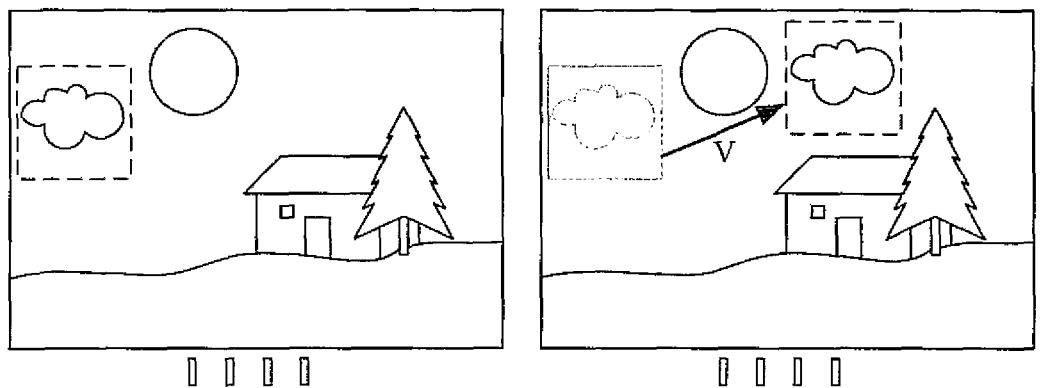
FIG. 1 (A)
(Prior Art)
| \|k\| | 0 | 1 | 2~3 | 4~7 | 8~15 | ...... | 128~255 | ... ... |
|---|---|---|---|---|---|---|---|---|
| Bits | 1 | 3 | 5 | 7 | 9 | ...... | 17 | ... ... |
FIG. 1 (B)
(Prior Art)
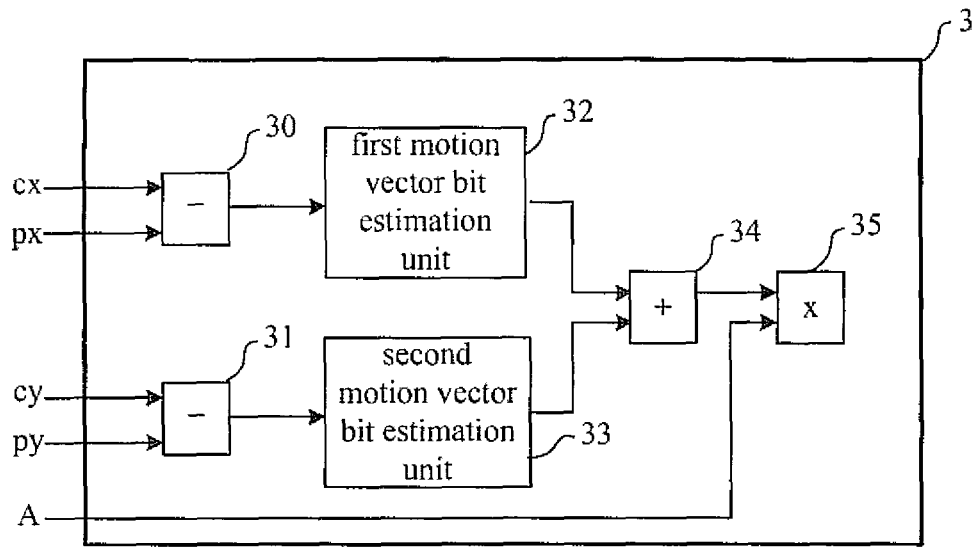
FIG. 1 (C)
(Prior Art)

MOTION ESTIMATION APPARATUS AND MOTION ESTIMATION METHOD

CROSS REFERENCE TO RELATED PATENT APPLICATIONS

This patent application claims priority from Taiwan Patent Application No. 099117084, filed in the Taiwan Patent Office on May 27, 2010, and incorporates the Taiwan patent application in its entirety by reference.

TECHNICAL FIELD

The present disclosure relates to video encoding, and more particularly, to a motion estimation apparatus and a motion estimation method capable of rapidly estimating the motion vector cost function corresponding to different candidate search positions without complex multiplication.

BACKGROUND OF THE PRESENT DISCLOSURE

In a video encoding system, motion estimation technology is utilized for determining a relative motion vector between an image and its adjacent image in a video stream. In many video encoding systems (such as the system which is compatible to H.264 or MPEG-4), a motion estimation method is usually adopted for assisting in finding dependency between different images, and applications of image compression, content analysis, etc. can be further achieved.

In generally, current image processing technology acquires the most appropriate motion vector, representing a relative shift of an area to be matched (a matching window) in two different images, by block matching. FIG. 1(A) is a schematic diagram of a motion vector V of the prior art. As shown in FIG. 1(A), the motion vector V is utilized for representing a vector corresponding to horizontal and vertical shift of a specific block between the prior image and the present image (referring to the motion vector V in FIG. 1(A)). In practice, the most commonly used block-matching discrepancy calculation method is Sum of Absolute Difference (SAD).

Among all kinds of motion vector estimation methods, motion vector cost function is a preferred estimation method, and the formula is as follows.

Motion vector cost function=$A \times (mvbits[cx\text{-}px] + mvbits[cy\text{-}py])$ Wherein, A is a scaling factor; [cx,cy] is a motion vector of a search candidate position; [px,py] is a motion vector of a predictor position; mvbits[cx-px] is a estimation value of bits of the differential value of the above two motion vectors in x direction, hereinafter a motion vector bits mvbits[cx-px]; mvbits[cy-py] is a estimation value of bits of the differential value of the above two motion vectors in y direction, hereinafter a motion vector bits mvbits[cx-px]. Take mvbits[k] as an example, the relative relationship between the bit estimation value and an absolute value |k| is shown in FIG. 1(B).

FIG. 1(C) is a schematic diagram of a circuit frame of a conventional motion vector cost function generator. As shown in FIG. 1(C), a motion vector cost function generator 3 comprises a first subtraction unit 30, a second subtraction unit 31, a first motion vector bit estimation unit 32, a second motion vector bit estimation unit 33, an addition unit 34 and a multiplication unit 35.

First, the subtraction unit 30 calculates the differential value [cx-px] according to an x component cx of the motion vector [cx,cy] of the search candidate position and an x component px of the motion vector [px,py] of the predictor position. The second subtraction unit 31 calculates the differential value of the [cy-py] according to a y component cy of the motion vector [cx,cy] of the search candidate position and a y component py of the motion vector [px,py] of the predictor position. Subsequently, the first motion vector bit estimation unit 32 calculates the motion vector bits mvbits[cx-px] according to the differential value of the [cx-px]; and the second motion vector bit estimation unit 33 calculates the motion vector bits mvbits[cy-py] according to the differential value of the [cy-py]. Afterwards, the addition unit 34 adds mvbits[cx-px] to mvbits[cy-py] and obtains a result of (mvbits[cx-px]+mvbits[cy-py]). Finally, the multiplication unit 35 multiplies the value of (mvbits[cx-px]+mvbits[cy-py]) by the scaling factor A and obtains the motion vector cost function.

However, the circuit frame of the conventional motion vector cost function generator 3 has a defect that it needs to conduct complex multiplications by the high level multiplication unit 35, hence resulting in problems of time limit and increase of logic degree, etc.

Therefore, a motion estimation apparatus and method thereof are provided, for resolving the above problems.

SUMMARY OF THE PRESENT DISCLOSURE

As an embodiment of the present disclosure, a motion estimation apparatus is provided. In the embodiment, the motion estimation apparatus is used in a video encoding system. The motion estimation apparatus includes a first calculation module and a second calculation module. When a search position moves from a first candidate search position to a second candidate search position along a search path, the first calculation module can estimate a first differential motion vector cost according to a search path information corresponding to the search path. The second calculation module selectively adds the first differential motion vector cost to an initial motion vector cost or subtracts the first differential motion vector cost from the initial motion vector cost according to a predetermined rule, such that a first motion vector cost corresponding to the second candidate search position can be obtained.

As another embodiment of the present disclosure, a calculation method of motion estimation is provided. In the embodiment, the method is used in a video encoding system. When a search position moves from a first candidate search position to a second candidate search position along a search path, estimating a first differential motion vector cost according to a search path information corresponding to the search path. Selectively adding the first differential motion vector cost to an initial motion vector cost or subtracts the first differential motion vector cost from the initial motion vector cost according to a predetermined rule, so that a first motion vector cost corresponding to the second candidate search position can be obtained.

As stated above, the motion estimation apparatus disclosed in the embodiment of the present disclosure can estimate the motion vector cost function rapidly and accurately without any complex multiplications, So it is capable of avoiding the problem such as time limit, increase of logic degree and bad efficiency of motion estimation, etc. which is encountered in the prior art. Particularly, when the motion estimation apparatus conducts the motion estimation of a plurality of candidate search positions, the effect of improving the efficiency of motion estimation will be more obvious.

The advantages and spirit related to the present disclosure can be further understood via the following detailed description and drawings.

Following description and figures are disclosed to gain a better understanding of the advantages of the present disclosure.

BRIEF DESCRIPTION OF THE DRAWINGS

FIG. 1(A) is a schematic diagram of a motion vector V of the prior art; FIG. 1(B) illustrates the relative relationship between a bit estimation value and an absolute value |k|; FIG. 1(C) is a schematic diagram of a circuit frame of a motion vector cost function generator of the prior art.

DETAILED DESCRIPTION OF THE PREFERRED EMBODIMENT

Various embodiments of the present disclosure relate to a motion estimation apparatus and method thereof which is capable of rapidly estimating the motion vector cost function corresponding to different candidate search positions without complex multiplications.

Figure 2:
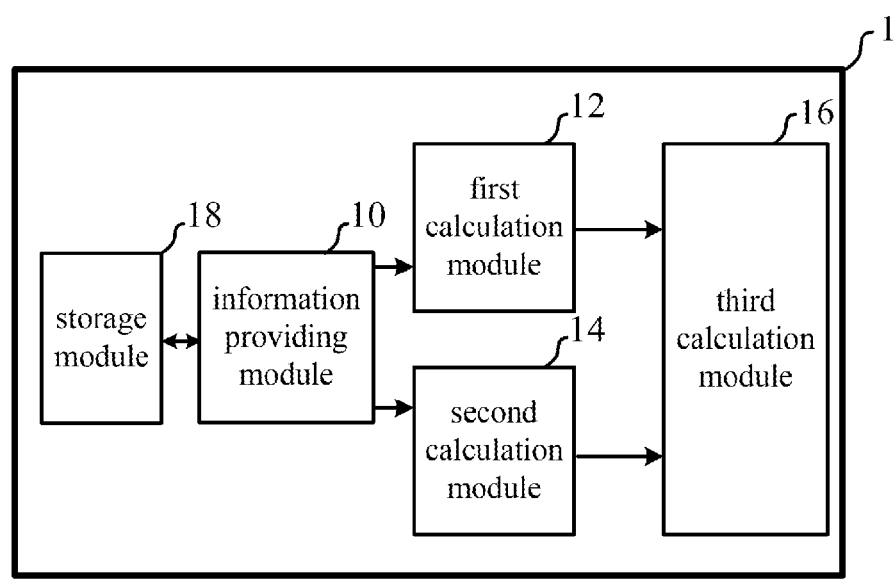
FIG. 2 is a functional block diagram of the motion estimation apparatus according to a first embodiment of the present disclosure.

The first embodiment of the present disclosure discloses a motion estimation apparatus. In this embodiment, the motion estimation apparatus is used in a video encoding system. FIG. 2 is a functional block diagram of the motion estimation apparatus. As shown in FIG. 2, the motion estimation apparatus 1 comprises an information providing module 10, a first calculation module 12, a second calculation module 14, a third calculation module 16 and a storage module 18. Wherein, the information providing module 10 is coupled to the first calculation module 12, the second calculation module 14 and the storage module 18, and the first calculation module 12 and the second calculation module 14 are both coupled to the third calculation module 16.

Figure 3A:
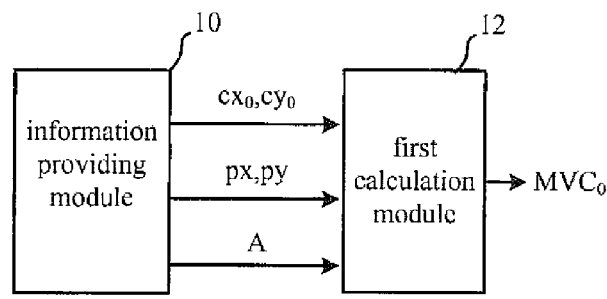
FIG. 3(A) illustrates the information transmitting between the information providing module and the first calculation module in FIG. 2.

In the embodiment, the first calculation module 12 calculates the initial motion vector cost $MVC_0$ corresponding to a first candidate search position $(x_1, y_1)$ before the calculation of the motion estimation, i.e. a search position, starting to move from the first candidate search position $(x_1, y_1)$ along a search path. The search position is utilized for representing the position which the calculation of the motion estimation is currently conducting with. As shown in FIG. 3(A), assuming that $[cx_0, cy_0]$ denotes a motion vector corresponding to the first candidate search position $(x_1, y_1)$, and $[px, py]$ denotes a motion vector of the predictor position, the information providing module 10 supplies $[cx_0, cy_0]$, $[px, py]$ and the scale factor A to the first calculation module 12, such that the first calculation module 12 can calculate the initial motion vector cost $MVC_0$ according to these information.

For alleviating the problems of time limit and increase of logic degree resulted from the complex multiplications by a high level multiplier in the prior art, it is remarkable that the first calculation module 12 calculates the initial motion vector cost $MVC_0$ by an accumulator including a plurality of addition units, instead of performing complex multiplications by a high level multiplier, so as to effectively reduce cost of circuit components.

Please note that the information providing module 10, the third calculation module 16, which is merely a simple combination of adders, and the storage module 18 are familiar to those skilled in the art and are not the issue of the present disclosure; thus, descriptions of those elements are omitted herein. It is also remarkable that an embodiment of the present disclosure does not necessarily comprise the above three elements; that is, the essence of the present disclosure is structures and functions of the first calculation module 12 and the second calculation module 14.

Figure 3B:
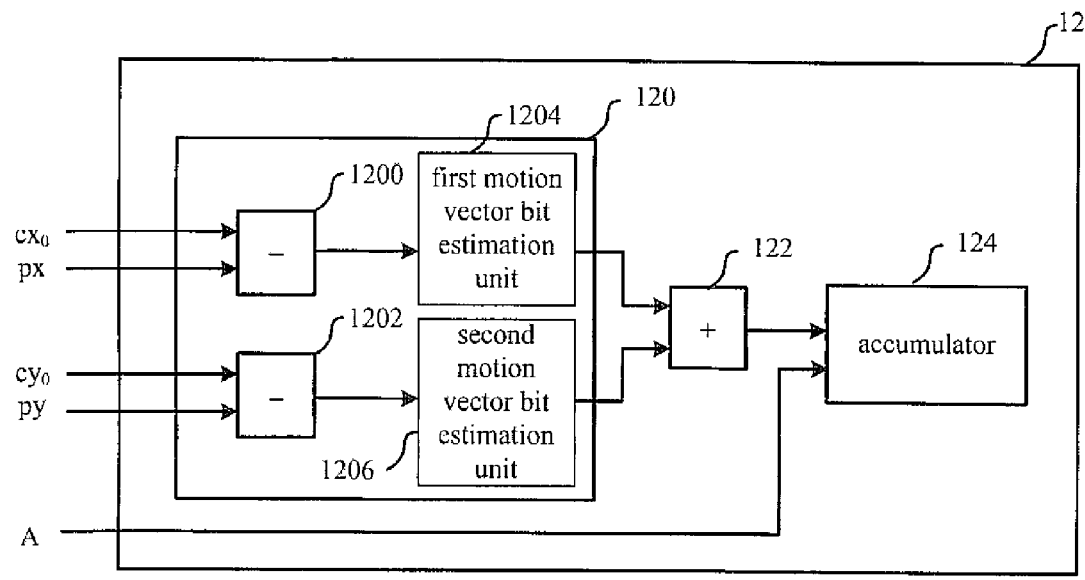
FIG. 3(B) is a detailed functional block diagram of the first calculation module in FIG. 2.
Figure 3C:
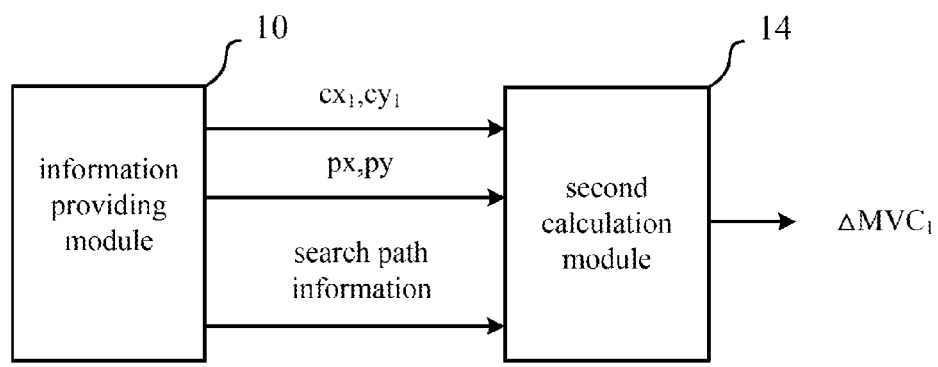
FIG. 3(C) illustrates the information transmitting between the information providing module and the second calculation module in FIG. 2.

FIG. 3(B) is a detailed functional block diagram of the first calculation module 12. As shown in FIG. 3(B), the first calculation module 12 comprises a motion vector bits generator 120, an adder 122 and an accumulator 124. The motion vector bits generator 120 comprises a first subtractor 1200, a second subtractor 1202, a first motion vector bit estimation unit 1204 and a second motion vector bit estimation unit 1206. The accumulator 124 includes a plurality of addition units.

When the first subtractor 1200 receives $cx_0$ and px, the first subtractor 1200 subtracts px from $cx_0$ and sends the result to the first motion vector bit estimation unit 1204, accordingly, the first motion vector bit estimation unit 1204 generates a first motion vector bits; when the second subtractor 1202 receives $cy_0$ and py, the second subtractor 1202 subtracts the py from $cy_0$ and sends the result to the second motion vector bit estimation unit 1206, accordingly, the second motion vector bit estimation unit 1206 generates a second motion vector bits. Subsequently, when the adder 122 receives the first motion vector bits and the second motion vector bits respectively from the first motion vector bit estimation unit 1204 and the second motion vector bit estimation unit 1206, the adder 122 adds the first motion vector bits to the second motion vector bits and sends the result to the accumulator 124. With the plurality of addition units in itself, the accumulator 124 is capable of calculating the result of the addition result of the adder 122 multiplied by the scale factor A.

Note that although the present disclosure still need to calculate the result of the addition result of the adder 122 multiplied by the scale factor A when the first calculation module 12 calculates the initial motion vector cost $MVC_0$, however, because the scale factor A is a constant, the first calculation module 12 needs not to conduct complex multiplications by the high level multiplier; on the contrary, the present disclosure only need to conduct a simple operation of multiplying the addition result of the adder 122 by a constant by the plurality of addition units included in the accumulator 124, so as to obtain the initial motion vector cost $MVC_0$.

After the first calculation module 12 calculates the initial motion vector cost $MVC_0$ of the first candidate search position $(x_1, y_1)$, the calculation of the motion estimation, i.e. the search position starts to be conducted respectively for each candidate search positions in sequence along the search path. Certainly, the search path needs to be determined before the calculation of the motion estimation starts, so as to facilitate the subsequent motion estimation. In fact, the search path may be a default value of the system or set by a user.

Assuming that the calculation of the motion estimation moves from the first candidate search position $(x_1,y_1)$ to a second candidate search position $(x_2,y_2)$ along the search path, and $[cx_1,cy_1]$ denotes a motion vector of the second candidate search position $(x_2,y_2)$. As shown in FIG. 3 (C), the information providing module 10 supplies $[cx_1,cy_1]$, [px,py] and a search path information corresponding to the search path to the second calculation module 14; accordingly, the second calculation module 14 calculates the first motion vector cost differential value $\Delta MVC_1$ according to these information. According to an embodiment of the present disclosure, in a process of search scanning, each moving distance is generally not too long (e.g. a pixel) in the calculation of the motion estimation, and is generally either in a horizontal direction or in a vertical direction; hence, the loading of the second calculation module 14 calculating the first motion vector cost differential value $\Delta MVC_1$ is not heavy, accordingly, computing resources of system can be retrenched effectively.

Figure 3D:
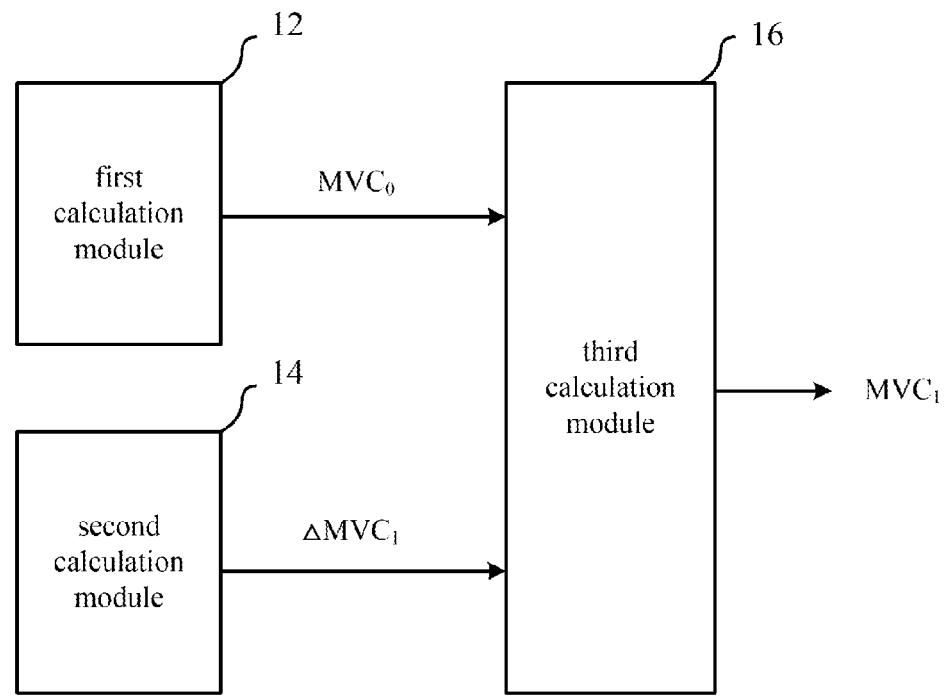
FIG. 3(D) illustrates the information transmitting in the first calculation module, second calculation module and the third calculation module in FIG. 2.

Subsequently, as shown in FIG. 3(D), the first calculation module 12 has calculated the initial motion vector cost $MVC_0$ of the first candidate search position $(x_1,y_1)$, and the second calculation module 14 has calculated the first motion vector cost differential value $\Delta MVC_1$; hence, the third calculation module 16 conducts an operation on $MVC_0$ and $\Delta MVC_1$ to obtain a motion vector cost $MVC_1$ of the second candidate search position. Please note that the third calculation module 16 selectively adds $\Delta MVC_1$ to $MVC_0$ or subtracts $MVC_0$ from $\Delta MVC_1$ to obtain $MVC_1$ according to a predetermined rule, and the predetermined rule is determined by a differential coordinate value between the first candidate search position $(x_1,y_1)$ and the second candidate search position $(x_2,y_2)$ estimated by the third calculation module 16 according to the search path information. That is, a differential x-coordinate value $(x_2-x_1)$ and a differential y-coordinate value $(y_2-y_1)$ of the two search positions related to the predetermined rule can be either positive or negative.

Figure 4:
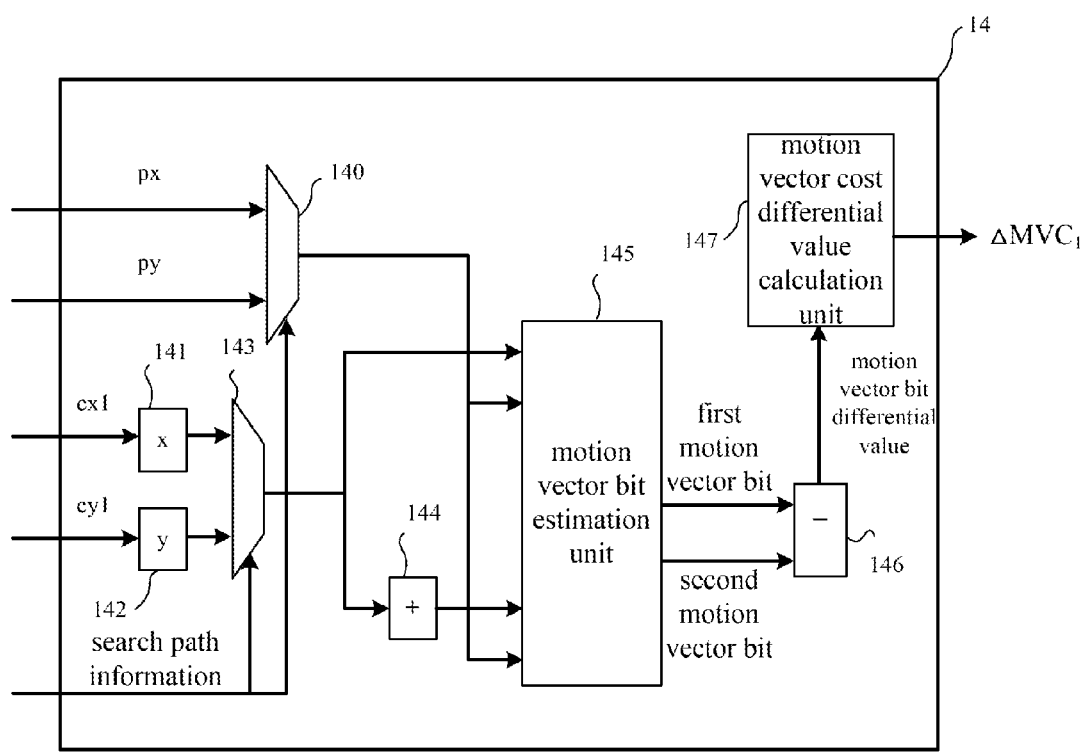
FIG. 4 is a detailed functional block diagram of the second calculation module in FIG. 2.

Later depicts details of how the second calculation module 14 calculates the first motion vector cost differential value $\Delta MVC_1$ according to $[cx_1,cy_1]$, [px,py] and the search path information corresponding to the search path. FIG. 4 is a detailed functional block diagram of the second calculation module 14. As shown in FIG. 4, the second calculation module 14 includes a first multiplexer 140, an x component processor 141, a y component processor 142, a second multiplexer 143, an adder 144, a motion vector bit estimation unit 145, a subtractor 146 and a motion vector cost differential value calculation unit 147.

In the embodiment, the first multiplexer 140 is utilized for receiving the motion vector [px,py] of the predictor position and the search path information inputted by the information providing module 10, and outputting [px,py] to the motion vector bit estimation unit 145. As to the motion vector $[cx_1, cy_1]$ corresponding to the second search position $(x_2,y_2)$ inputted by the information providing module 10, the x component $cx_1$ and the y component $cy_1$ of the motion vector $[cx_1,cy_1]$ are respectively processed by the x component processor 141 and the y component processor 142, and further transmitted to the second multiplexer 143; and, the second multiplexer 143 outputs $MV_1[cx_1,cy_1]$ to the motion vector bit estimation unit 145. The adder 144 is disposed between the second multiplexer 143 and the motion vector bit estimation unit 145, for adding a displacement to the $MV_1$ according to the search path information, so as to change $MV_1$ into $MV_1'$ according to actual movement. In fact, $MV_1'$ may be $[cx_1',cy_1]$, $[cx_1,cy_1']$ or $[cx_1',cy_1']$, depending on each of the moving distance in different search paths. For example, if the search path is a serpentine path, then the $MV_1'$ should be $[cx_1',cy_1]$ or $[cx_1,cy_1']$; and if the search path is a diamond-shaped path, then the $MV_1'$ may be $[cx_1',cy_1']$.

Subsequently, the motion vector bit estimation unit 145 generates the first motion vector bit and the second motion vector bit according to the $MV_1$ and $MV_1'$ respectively. After that, the subtractor 146 subtracts the first motion vector bit from the second motion vector bit to obtain the motion vector bit differential value. Finally, the motion vector cost differential value calculation unit 147 calculates the motion vector bit differential value to obtain the first motion vector cost differential value $\Delta MVC_1$.

Figure 5A:
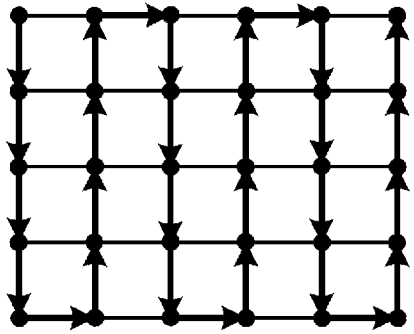
FIG. 5(A) through FIG. 5(C) illustrate search paths with different types.
Figure 5B:
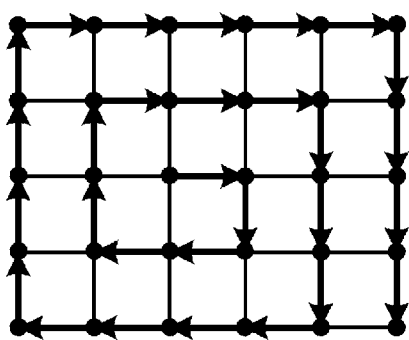
Figure 5C:
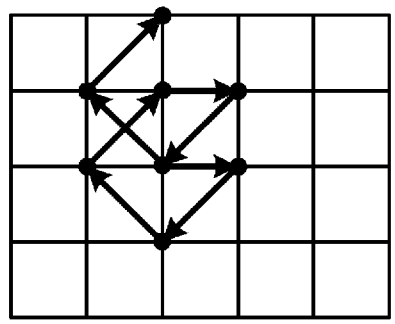

Moreover, the search path is not limited to certain specific types. As shown from FIG. 5(A) to FIG. 5(C), the search path may be a serpentine path (FIG. 5(A)), a spiral path (FIG. 5(B)) or a diamond-shaped path (FIG. 5(C)), but it is not limited thereto. In fact, these search paths with different types and the corresponding search path information (such as all search positions along the search path and the search sequences) may be stored in the storage module 18. When the second calculating module 14 needs the information for calculation, the information providing module 10 reads these information from the storage module 18 and provide these information to the second calculation module 14.

Figure 6:
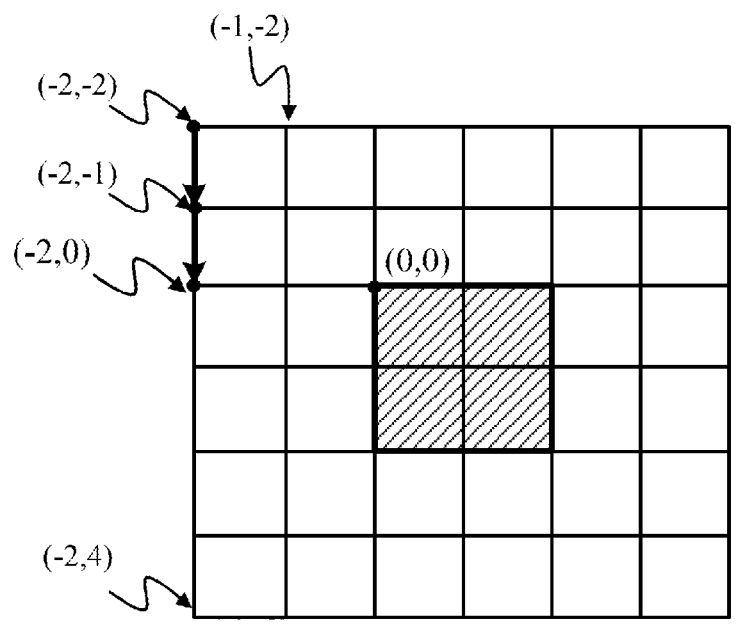
FIG. 6(A) and FIG. 6(B) are schematic diagrams of the search scanning through a serpentine path.
FIG. 6(C) is an example of Factional Motion Estimation (FME).
Figure 6:
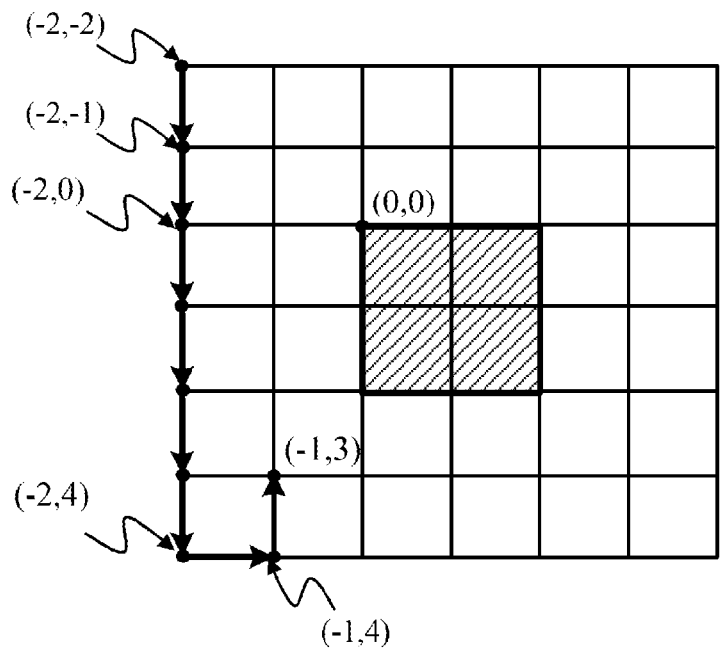
Figure 6:
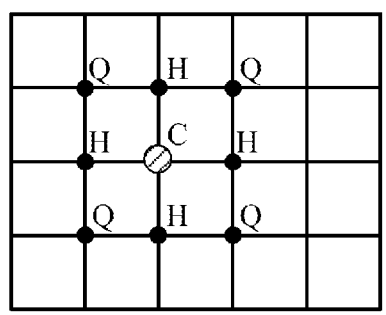

An example adopting a serpentine path for searching and scanning all pixels of an image is then depicted as follows. FIG. 6 (A) and FIG. 6 (B) are schematic diagrams of searching and scanning with a serpentine path. As shown in FIG. 6(A), assuming that an area to be matched (matching window) is the oblique line area in FIG. 6(A) and the coordinate of the predictor position is (0,0), the search path starts from the first candidate search position (−2,−2), serpentine searching in the sequence (−2,−1), (−2,0), ..., (−2,4), (−1,4), (−1,3), ... to the position (4,4).

The first calculating module 12 calculates the initial motion vector cost $MVC_0$ of the position (−2,−2) according to the $[cx_0,cy_0]$, [px,py] and the scale factor A first, before the calculation of the motion estimation, i.e. the search position, starts searching from the position (−2,−2) along the search path.

In this example, $[cx_0,cy_0]=[-2,-2]$, and $[px,py]=[0,0]$. Then, the second calculation module 14 calculates the first motion vector cost differential value $\Delta MVC_1$ according to $[cx_1,cy_1]$, [px,py] and the search path information corresponding to the search path, when the calculation of the motion estimation moves from the position (−2,−2) to the position (−2,−1) along the search path. In this example, $[cx_1, cy_1]=[-2,-1]$, and [px,py]=[0,0], that is, only $cy_1$ is different from $cy_0$, while $cx_1$ is equal to $cx_0$; thus, the second calculation module 14 can calculate the $\Delta MVC_1$ without complex operations. After that, the third calculation module 16 selectively adds $\Delta MVC_1$ to $MVC_0$ or subtracts $\Delta MVC_1$ from $MVC_0$ to obtain the $MVC_1$ according to a predetermined rule. In this example, when the calculation of the motion estimation moves from the position (−2,−2) to the position (−2,−1), $y_1-y_0=(-1)-(-2)=1>0$, which indicates that the calculation of the motion estimation is moving toward positive direction in y direction; thus, the third calculation module 16 will add $\Delta MVC_1$ to $MVC_0$ for obtaining $MVC_1$. Likewise, the situation that the calculation of the motion estimation moves from the position (−2,−1) to the position (−2,0) along the search path is similar, and is omitted herein.

As shown in FIG. 6(B), the situation may be different when the calculation of the motion estimation continuously moves from the position (−2,4) to the position (−1,4) along the search path. Assuming that the motion vector cost of the position (−2,4) obtained in the previous step is $MVC_0$, and $[cx_6,cy_6]=[-2,4]$, the second calculation module 14 may calculate the seventh motion vector cost differential value $\Delta MVC_7$ according to $[cx_7,cy_7]$, [px,py] and the search path information corresponding to the search path. In this example, $[cx_7,cy_7]=[-1,4]$, and [x,py]=[0,0], that is, $cx_7$ is different from $cx_6$, while $cy_7$ is equal to $cy_6$; thus, the second calculation module 14 can calculate $\Delta MVC_7$ without complex operations. After that, the third calculation module 16 selectively adds $\Delta MVC_1$ to $MVC_6$ or subtracts the $\Delta MVC_7$ from $MVC_6$ to obtain $MVC_7$ according to a predetermined rule. In this example, when the calculation of the motion estimation moves from the position (−2,4) to the position (−1,−4), $y_7-y_6=(-1)-(-2)=1>0$, which indicates that the calculation of the motion estimation is moving toward positive direction in x direction; thus, the third calculation module 16 will add $\Delta MVC_7$ to $MVC_6$ for obtaining $MVC_7$.

In practical applications, the motion estimation system according to the present disclosure can also be used in Factional Motion Estimation (FME) in addition to Integer Motion Estimation (IME) in the above embodiments. For example, as shown in FIG. 6 (C), in FME, the candidate search position may be separated into a middle position C, a ½ candidate search position H and a ¼ candidate search position Q. If the motion estimation apparatus is located in the middle position C, then the calculation of the motion estimation can move to the plurality of ½ candidate search positions H by one move. As to the plurality of ¼ candidate search positions Q, the calculation of the motion estimation moves from the middle position C to the plurality of ¼ candidate search positions Q by two moves, or it moves from the plurality of ½ candidate search positions H to the plurality of ¼ candidate search positions Q by one move.

Figure 7:
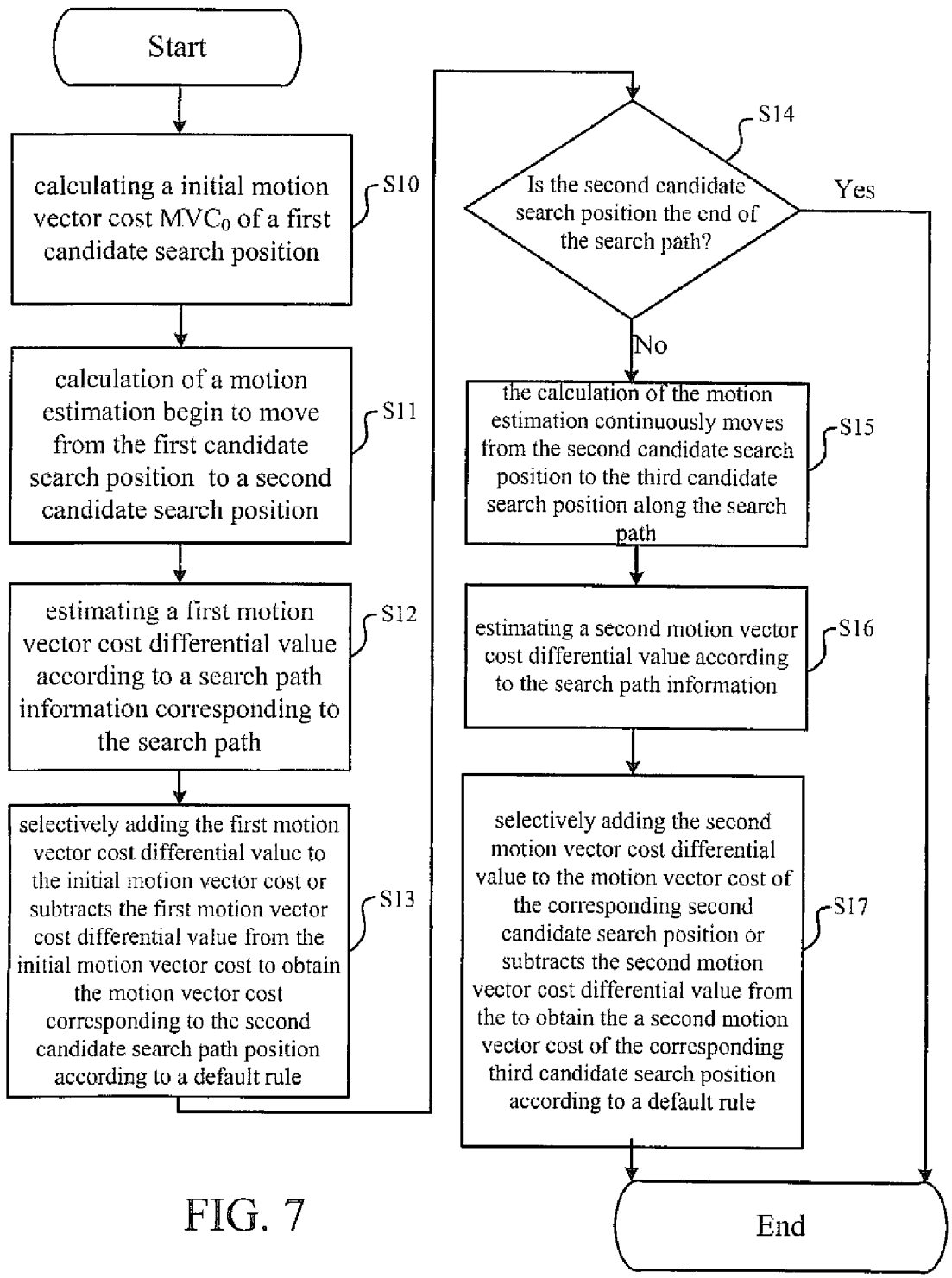
FIG. 7 is a flowchart of the motion estimation method according to a second embodiment of the present disclosure.

The second embodiment of the present disclosure is a motion estimation method. In the embodiment, the method is used in a video encoding system. FIG. 7 is a flowchart of the motion estimation method. As shown in FIG. 7, first, in step S10, the motion estimation method calculates the initial motion vector cost $MVC_0$ of the first candidate search position $(x_1,y_1)$, before the calculation of the motion estimation starts. In fact, the $MVC_0$ is obtained by calculating according to the motion vector $[cx_0,cy_0]$ of the first candidate search position, the motion vector [px,py] of the predictor position and the scale factor A. For alleviating the problems of time limit and increase of logic degree resulted from the complex multiplications by a high level multiplier in prior art, it is remarkable that the method implements simple multiplications by an accumulator including a plurality of addition units, instead of performing complex multiplications by a high level multiplier, so as to obtain the initial motion vector cost $MVC_0$.

Subsequently, in step S11, the calculation of the motion estimation begin to move from a fist candidate search position $(x_1,y_1)$ to a second candidate search position $(x_2,y_2)$ along a first search path. Then, performing the step S12, estimating a first motion vector cost differential value $\Delta MVC_1$ according to search path information corresponding to the search path. In fact, the first motion vector cost differential value $\Delta MVC_1$ is calculated according to the search path information, the motion vector $[cx_1,cy_1]$ of the corresponding second candidate search position $(x_2,y_2)$, and the motion vector [px,py] of the corresponding predictor position. $x_1$ and $x_2$ are horizontal coordinate values corresponding to the first candidate search position and the second candidate search position respectively; $y_1$ and $y_2$ are the vertical coordinate values corresponding to the first candidate search position and the second candidate search position respectively.

In fact, the search path may be serpentine path, spiral path or diamond path, or it may be a default value of system or may be set by a user, which is not limited to certain specific types. In the embodiment, assuming that the search path passes through the first candidate search position $(x_1,y_1)$, the second candidate search position $(x_2,y_2)$, the third candidate search position $(x_3,y_3)$ in sequence, and the search path information includes the coordinate values of the first candidate search position $(x_1,y_1)$, the second candidate search position $(x_2,y_2)$, and the third candidate search position $(x_3,y_3)$.

Subsequently, in step S13, the method selectively adds the first motion vector cost differential value $\Delta MVC_1$ to the initial motion vector cost $MVC_0$ or subtracts the first motion vector cost differential value $\Delta MVC_1$ from the initial motion vector cost $MVC_0$ to obtain the motion vector cost $MVC_1$ corresponding to the second candidate search path position $(x_2,y_2)$ according to a predetermined rule. In practical applications, the predetermined rule is determined by a differential coordinate value between the first candidate search position $(x_1, y_1)$ and the second candidate search position$(x_2,y_2)$, that is, a differential x-coordinate $(x_2-x_1)$ and a differential y-coordinate $(y_2-y_1)$ of the two search positions related to the predetermined rule can either be positive or negative.

After calculating the motion vector cost $MVC_1$ of the corresponding second candidate search position $(x_2,y_2)$, in step S14, determining whether the second candidate search position is the end of the search path. If a determination result in the step S14 is true, indicating that the calculation of the motion estimation has moved to the end of the search path, the whole calculation procedure of the motion estimation is finished; if the determination result in the step S14 is false, converting to step S15, the calculation of the motion estimation continuously moves from the second candidate search position $(x_2,y_2)$ to the third candidate search position $(x_3,y_3)$ along the search path.

In step S16, estimating a second motion vector cost differential value $\Delta MVC_2$ according to the search path information. $x_3$ and $y_3$ are the horizontal coordinate values and vertical coordinate values corresponding to the third candidate search position, respectively. In step S17, selectively adding the second motion vector cost differential value $\Delta MVC_2$ to the motion vector cost $MVC_1$ of the corresponding second candidate search position $(x_2,y_2)$ or subtracts the second motion vector cost differential value $\Delta MVC_2$ from the $MVC_1$ to obtain the a second motion vector cost $MVC_2$ of the corresponding third candidate search position $(x_3,y_3)$ according to a predetermined rule.

Then, determining if the third candidate search position is the end of the search path. If a determination result is false, indicating that the search path is not yet finished, repeating the above steps until the calculation of the motion estimation of the whole search path is finished. Thereby, the motion vector cost of each candidate search position corresponding to the search path can be obtained with the method, and the candidate search position of the lowest motion vector cost can be further determined, accordingly.

In conclusion, the motion estimation apparatus according to the embodiment of the present disclosure is capable of estimating the motion vector cost function rapidly and accurately without complex multiplications; thus, it is capable of avoiding the problems of time limit, increase of logic degree and low efficiency of motion estimation, etc., encountered in the prior art. Particularly, when the motion estimation apparatus conducts the motion estimation of a plurality of candidate search positions simultaneously, the effect of improving the efficiency of motion estimation will be more obvious. In addition, in a process of search scanning, each moving distance is generally not too long (e.g. a pixel) in the calculation of the motion estimation, and is generally either in a horizontal direction or in a vertical direction; hence, the load of the motion estimation apparatus calculating the first motion vector cost differential value is not heavy, accordingly, computing resources of system can be retrenched effectively.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A motion estimation apparatus used in a video encoding system, the motion estimation apparatus comprising:
    a first calculation module that, when a search position moves from a first candidate search position to a second candidate search position along a search path, estimates a first differential motion vector cost according to search path information corresponding to the search path; and
    a second calculation module, coupled to the first calculation module, that adds the first differential motion vector cost to an initial motion vector cost or subtracts the first differential motion vector cost from the initial motion vector cost according to a predetermined rule to obtain a first motion vector cost corresponding to the second candidate search position.

2. The motion estimation apparatus of claim 1, further comprising:
    a third calculation module, coupled to the first calculation module and the second calculation module, which are adders that calculate the initial motion vector cost corresponding to the first candidate search position.

3. The motion estimation apparatus of claim 1, wherein the predetermined rule relates to a differential coordinate value between the first candidate search position and the second candidate search position; and
    the differential coordinate value between the first candidate search position and the second candidate search position is estimated according to the search path information.

4. The motion estimation apparatus of claim 1, wherein the search path is a serpentine path, a spiral path, or a diamond path.

5. The motion estimation apparatus of claim 1, wherein:
    the first calculation module estimates a second motion vector cost differential value according to the search path information when the search position continuously moves from the second candidate search position to a third candidate search position along the search path; and
    the second calculation module selectively adds the second motion vector cost differential value to the first motion vector cost or subtracts the second motion vector cost differential value from the first motion vector cost according to the predetermined rule to obtain a second motion vector cost of the corresponding third candidate search position; and
    the first calculation module and the second calculation module repetitively perform above operations correspondingly when calculation of the motion estimation continuously moves to a proceeding candidate search position.

6. The motion estimation apparatus of claim 5, wherein each of the first candidate search position, the second candidate search position, and the third candidate search position comprises a horizontal coordinate value and a vertical coordinate value, and wherein the predetermined rule relates to a differential coordinate value between the second candidate search position and the third candidate search position.

7. The motion estimation apparatus of claim 6, wherein:
    the search path information comprises coordinate values of the first candidate search position, the second candidate search position, and the third candidate search position through which the search path passes in sequence.

8. The motion estimation apparatus of claim 6, further comprising:
    a storage module that stores the search path information, the initial motion vector cost, the first motion vector cost differential value, the first motion vector cost, the second motion vector cost differential value, and the second motion vector cost.

9. A method of motion estimation calculation in a video encoding system, the method comprising:
    estimating a first differential motion vector cost according to search path information corresponding to a search path when a search position moves from a first candidate search position to a second candidate search position; and
    adding the first differential motion vector cost to an initial motion vector cost or subtracting the first differential motion vector cost from the initial motion vector cost according to a predetermined rule to obtain a first motion vector cost corresponding to the second candidate search position.

10. The method of claim 9, wherein the initial motion vector cost corresponds to the first candidate search position, and is obtained by addition operations.

11. The method of claim 9, wherein the predetermined rule relates to a differential coordinate value between the first candidate search position and the second candidate search position.

12. The method of claim 9, wherein the search path is a serpentine path, a spiral path, or a diamond path.

13. The method of claim 9, further comprising:
    estimating a second differential motion vector cost according to the search path information when the search position moves from the second candidate search position to a third candidate search position along the search path;
    selectively adding the second differential motion vector cost to the first motion vector cost or subtracts the second differential motion vector cost from the first motion vector cost according to the predetermined rule to obtain a third motion vector cost corresponding to the third candidate search position; and
    repetitively performing above operations correspondingly when the search position continuously moves to a proceeding candidate search position.

14. The method of claim 13, wherein each of the first candidate search position, the second candidate search position, and the third candidate search position comprises a horizontal coordinate value and a vertical coordinate value, and the predetermined rule relates to a differential coordinate value between the second candidate search position and the third candidate search position.

15. The method of claim 14, wherein the search path information comprises coordinate values of the first candidate search position, the second candidate search position, and the third candidate search position through which the search path passes in sequence.

\* \* \* \* \*